(12) United States Patent
Alakoski et al.

(10) Patent No.: US 8,527,607 B2
(45) Date of Patent: Sep. 3, 2013

(54) MESSAGING MECHANISM

(75) Inventors: Timo Tapani Alakoski, Helsinki (FI); Yrjo Markus Raivio, Helsinki (FI); Manish Varma, Haryana (IN)

(73) Assignee: Nokia Siemens Networks Oy, Espoo (FI)

( * ) Notice: Subject to any disclaimer, the term of this patent is extended or adjusted under 35 U.S.C. 154(b) by 430 days.

(21) Appl. No.: 12/808,189

(22) PCT Filed: Dec. 16, 2008

(86) PCT No.: PCT/EP2008/067599
§ 371 (c)(1),
(2), (4) Date: Oct. 6, 2010

(87) PCT Pub. No.: WO2009/080605
PCT Pub. Date: Jul. 2, 2009

(65) Prior Publication Data
US 2011/0173291 A1   Jul. 14, 2011

(30) Foreign Application Priority Data

Dec. 21, 2007   (EP) .................................... 07150342

(51) Int. Cl.
*G06F 15/16*   (2006.01)

(52) U.S. Cl.
USPC .......................................... 709/217; 708/228

(58) Field of Classification Search
USPC ................................................ 709/217, 228
See application file for complete search history.

(56) References Cited

U.S. PATENT DOCUMENTS

| 7,602,723 | B2* | 10/2009 | Mandato et al. ............... 370/236 |
| 2002/0126701 | A1 | 9/2002 | Requena |
| 2002/0184373 | A1* | 12/2002 | Maes ............................ 709/228 |
| 2003/0163545 | A1* | 8/2003 | Koskelainen et al. ........ 709/217 |
| 2003/0217174 | A1 | 11/2003 | Dorenbosch et al. |
| 2005/0237978 | A1 | 10/2005 | Segal |
| 2006/0133335 | A1 | 6/2006 | Garcia-Martin |
| 2006/0230154 | A1* | 10/2006 | Nguyenphu et al. .......... 709/227 |

FOREIGN PATENT DOCUMENTS

WO   03/009627   1/2003

OTHER PUBLICATIONS

WAP Push architectural Overview, Wireless Application Protocol Push Architectural Overview, Wireless Application Protocol Forum, Ltd. 1999, Nov. 8, 1999, http://www.wapforum.org/what/copyright.htm, a total of 26 pages.
J. Rosenberg et al., SIP: Session Initiation Protocol; draft-ietf-sip-bis-08.txtrfc2543; JTC-VC Meeting, 96. MPEG Meeting, Mar. 23, 2011, Geneva (Joint Collaborative Team on Video coding of IS/IEC JTC1/SC29/WG11 and TIU-T SG.16) URL: http://wftp3.itu.int/av-arch/jcTVC-site/-17/03/2011, Internet Engineering Task Force, vol. sip, No. 8, Feb. 21, 2002, XP015028050, 279 pages.

* cited by examiner

*Primary Examiner* — Asghar Bilgrami
(74) *Attorney, Agent, or Firm* — Squire Sanders (US) LLP (57) ABSTRACT

Exchange of small pieces of data among end user terminals and/or between end user terminals and a network has increased. Examples of such small pieces of data include presence information updates. A messaging mechanism piggybacking the data in a push session initiation request enables sending of small pieces of data with minimum delay and without an activated packet data connection, and without user interaction.

20 Claims, 4 Drawing Sheets

MESSAGING MECHANISM

FIELD

The invention relates to sending small pieces of data between two parties.

BACKGROUND

The following description of background art may include insights, discoveries, understandings or disclosures, or associations together with disclosures not known to the art prior relevant to the present invention but provided by the invention. Some such contributions of the invention may be specifically pointed out below, whereas other such contributions of the invention will be apparent from their context.

The evolvement of different services for mobile users has increased the exchange of small pieces of data among end user terminals and/or between end user terminals and a network. Examples of such small pieces of data include presence information updates and location information sent from a user terminal to a network server automatically without user interaction. For this kind of data exchange, i.e. a user terminal sending itself packet data, an activated packet data connection is required. The packet data connection in turn requires an activated packet data protocol context, or corresponding information defining a connection between the end user terminal and the network. Packet data protocol context activation contains assigning an IP address to the end user terminal to be used for packet data transmission to and from the end user terminal, and activating other subscriber-related parameters. Thus, the packet data protocol activation takes time and delays sending of the data. For example, presence information is occasional, usually time critical and should be forwarded without delay. One solution enabling delivery of a small piece of data as soon as it is available is to keep the packet data protocol context alive by sending "dummy messages". A drawback of this solution is that it waists network resources and consumes power in the end user terminal.

BRIEF DESCRIPTION

An object of the present invention is thus to provide a method and an apparatus for providing a messaging mechanism enabling sending of small pieces of data without an activated packet data connection. The object of the invention is achieved by apparatuses, a method, a computer program product and a communication system which are characterized by what is stated in the independent claims. The preferred embodiments of the invention are disclosed in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user terminal, server and/or corresponding component that is configured or configurable to support wireless push service or at least to support wireless push session initiation requests. The protocols used, the specifications of servers, bearers, user terminals, such as mobile terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on WAP (wireless access protocol defined by OMA (Open Mobile Alliance)) push over a global system for mobile communication (GSM) short message service (SMS) without restricting the embodiment to such an architecture, however.

Advantages of WAP push are that it supports open application development, enables automated messaging (i.e. without requiring a user to be involved in the messaging) and does not limit the content format, i.e. the type of the data sent in a push message is not restricted, the data may contain multimedia, WAP push thereby overcoming the limitations of short message service. (The limitations of short message service include that the content is limited to a text type and that user interaction is required for sending a short message from the user terminal.) An advantage, relating to GSM providing a circuit switched bearer, is that, compared with GPRS (general packet radio service) providing packet switched bearer, the coverage area of the circuit switched bearer is, at least presently, much more extensive. An advantage relating to the usage of SMS is that it is much more widely supported than other messaging methods.

Figure 1:
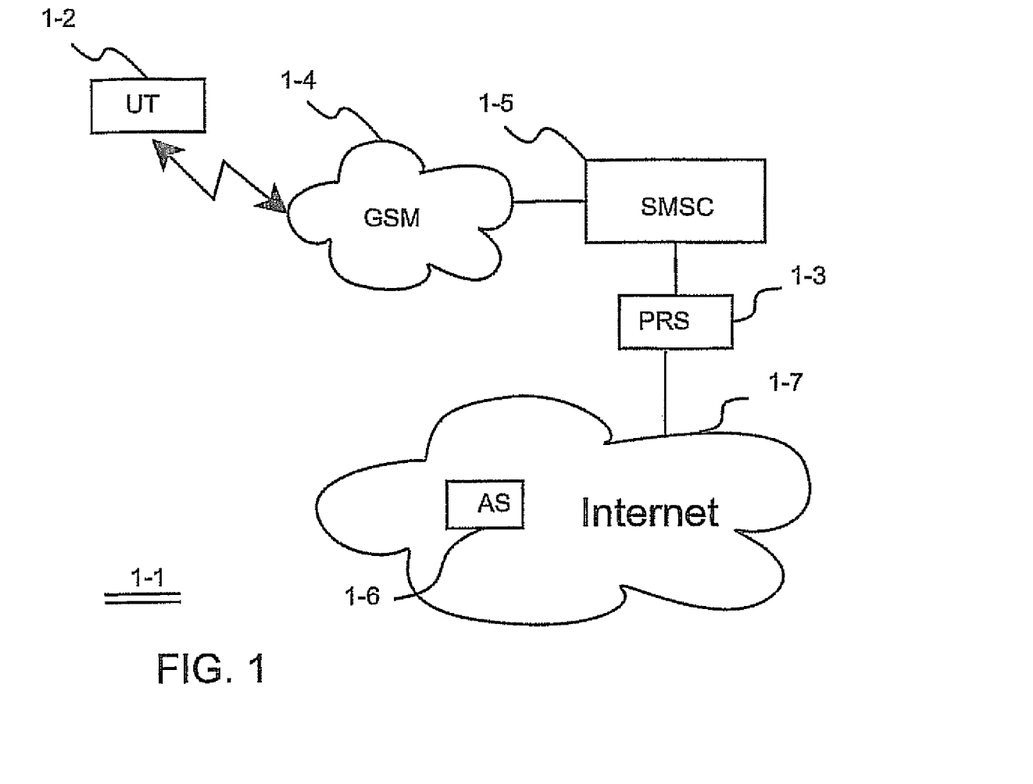
FIG. 1 illustrates an example of system architecture.

A general architecture of a communication system according to an embodiment is illustrated in FIG. 1, the embodiment providing sending of occasional, small pieces of data from a user terminal to another party without user interaction. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not be discussed in more detail here.

The communication system 1-1 in FIG. 1 comprises a user terminal 1-2, connectable via a circuit switched network 1-4 to a short message service centre 1-5 of its own network operator, the short message service centre 1-5 being connected via a push recipient server 1-3 to an application server 1-6 in a packet switched network 1-7, such as the Internet. The application server 1-6 may be any application server, such as a presence server, providing preferably a service utilizing user information updated by user terminals. The user terminal 1-2, configured to send piggybacked push session initiation requests, and the push recipient server 1-3 provide a revised push data flow (in prior art a push data flow is from a server to a user terminal, the revised push data flow is from the user terminal to the server or to another user terminal (not shown in FIG. 1)) transparently to the bearer (short message service centre SMSC 1-5) and the application server 1-6, as will be described below. Therefore, no amendments are needed to the bearer (e.g. SMSC) and the application server.

It should be appreciated that no push recipient server is required when data is sent to a user terminal configured to receive data in piggybacked push session initiation requests; it suffices that the system comprises a sending apparatus (a proxy server or a user terminal, for example) configured to send piggybacked push session initiation requests and a user terminal and a bearer between them, such as a direct link or the Internet or a network and a short message service centre.

A user terminal is a piece of equipment that associates, or is arranged to associate, the user terminal and its user with a subscription (with or without a subscriber identification module) and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of user terminals include a personal computer, a game console, a laptop (a notebook), a personal digital assistant, and a mobile station (mobile phone).

Figure 2:
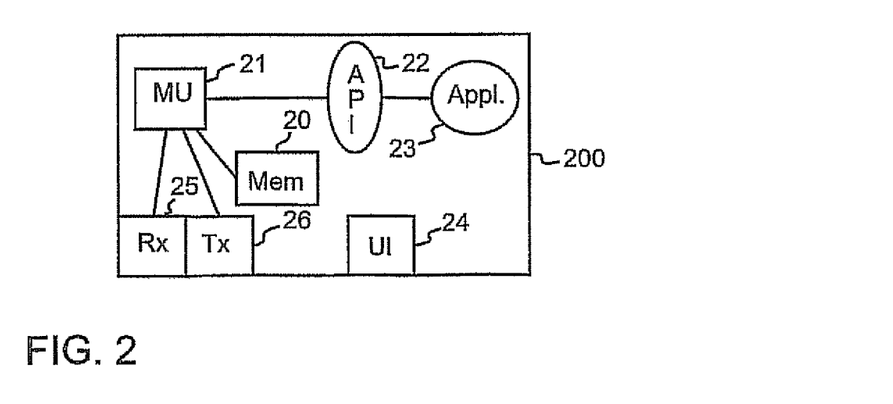
FIG. 2 is a simplified block diagram of a user terminal according to an embodiment.

FIG. 2 is a block diagram of a user terminal according to an embodiment. Although the user terminal has been depicted as one entity, different modules and memory may be implemented in one or more physical or logical entities. The connections shown in FIG. 2 are operative connections; the actual physical connections may be different.

In FIG. 2, the user terminal 200 is configured to support bidirectional push messaging. For this purpose, the user terminal comprises data storage 20 for storing data to be sent in a push session initiation request at least temporarily, a bidirectional messaging unit 21 for providing handling of received push messages, including piggybacked push session initiation requests, as well as handling of data to be sent piggybacked in push session initiation requests, one or more application interfaces 22 for applications to access the services of the bidirectional messaging unit, one or more applications 23, a user interface 24 for interaction with the user, a receiving unit 25 providing bearer services for receiving different inputs, information and messages, and a sending unit 26 providing bearer services for sending different outputs, information and messages. The bidirectional messaging unit 21 is configured to control the sending unit and be responsive to data received via an application programming interface (API) or the receiving unit. It should be appreciated that the user terminal may comprise other units. However, they are irrelevant to the actual invention and, therefore, they need not to be discussed in more detail here. The bidirectional messaging unit with the APIs forms an enhanced push client, the enhanced push client being capable of both receiving and sending piggybacked push session initiation requests.

In another embodiment, the user terminal comprises two separate push units: a push receiving unit for receiving piggybacked push session initiation requests (i.e. an amended push client, also called a push recipient) and a push sending unit for sending piggybacked push session initiation requests. Yet in a further embodiment, the user terminal is configured to send piggybacked push messages, not to receive them, i.e. comprises only the push sending unit. Still a further embodiment includes user terminals configured to receive piggybacked push messages, not to send them, i.e. comprising only the push receiving unit.

For sending piggybacked push session initiation requests, the unit handling the sending (i.e. the bidirectional messaging unit or the push sending unit), comprises at least a push initiator's submit function for sending notifications, and preferably, but not necessarily, also at least a push server's amended push delivery function.

The push initiator is an entity that originates push data and submits it to the push server for delivery to a push recipient. In addition to the submit function, the unit handling the sending may comprise also at least one of the following push initiator's functions: replacing a previously submitted push message, cancelling a push, querying for the status of a push and querying for a recipient's capabilities.

The push server, such as a push proxy gateway, receives the push data from a push initiator and is responsible for delivering the push data to a push recipient. In addition to the push server's amended delivery function for piggybacked push session initiation requests, the unit handling the sending may comprise a push server's delivery function for other push messages and/or also be configured to perform other push server's functions, examples of which include translating a recipient address into a format understood by the bearer network, transforming the push data to adapt it to the recipient's capabilities, storing the push data if the recipient is not available, notifying the push initiator about the final outcome of a push submission, and handling cancellation, replacement and/or recipient's capability requests from the push initiator.

A user terminal and/or an apparatus implementing one or more functions of a corresponding user terminal described in an embodiment comprises not only prior art means, but also means for implementing the one or more functions of a user terminal described in an embodiment and it may comprise separate means for each separate function, or means may be configured to perform two or more functions. The user terminal and/or the apparatus may be configured as a computer or a microprocessor, such as a single-chip computer element, including at least a memory for providing storage area used for an arithmetic operation and an operation processor for executing the arithmetic operation. Present user terminals and apparatuses comprise processors and memory that can be utilized when implementing an embodiment. The memory may be removable memory detachably connected to the apparatus. For example, the bidirectional messaging unit 21, or the push sending unit, or the receiving unit may be a software application, or a module, or a unit configured as an arithmetic operation, or as a program (including an added or updated software routine), executed by an operation processor, such as a central processing unit. An embodiment provides a computer program embodied in any user terminal-readable distribution/data storage medium, comprising program instructions which, when loaded into a user terminal, constitute the bidirectional messaging unit or the push sending unit. Programs, also called program products, including software routines, applets and macros, can be stored in any medium, and may be downloaded into a user terminal. In other words, all modifications and configurations required for implementing one or more functions of an embodiment may be implemented as added or updated software routines, application circuits (ASIC) and/or programmable circuits.

Figure 3:
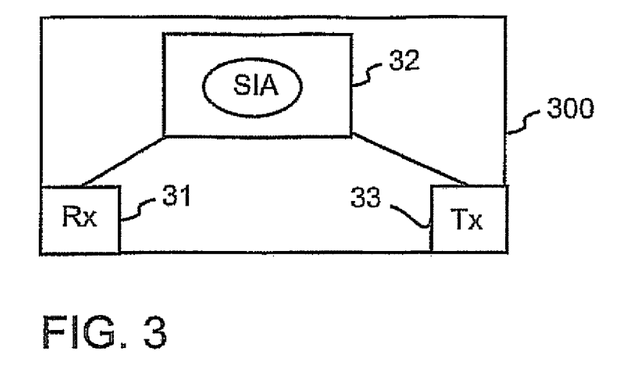
FIG. 3 is a simplified block diagram of a server component according to an embodiment.

FIG. 3 is a block diagram of a push recipient server, or a corresponding server component, according to an embodiment of the invention. Although the push recipient server has been depicted as one entity, different modules may be implemented in one or more physical or logical entities. Further, the push recipient server may be integrated into a short message service centre used in the transmission of a push message, or to another server, such as a server containing the application to which the push message content is targeted to, or it may be a standalone server serving one or more application servers/applications.

The push recipient server 300 is configured to receive piggybacked push session initiation requests and forward the piggybacked contents as update information for the target application server. For this purpose, the server comprises a receiving unit 31 for receiving push session initiation requests, a converting unit 32 for converting a piggybacked content in a push session initiation request into a format readable by the target application and a sending unit 33 for sending the converted content to a proper application (server), as will be described in detail in FIG. 4. The receiving unit 31 comprises preferably a session initiation application's (SIA) listening function for listening to push session initiation requests and receiving them.

It should be appreciated that the push recipient server may be configured to establish push sessions, to receive also other push messages and forward message contents in those messages, listen and receive over one or more different bearers, and comprise other units used in or for the wireless push service, such as a unit providing notifications relating to message delivery. Further, it may comprise units used for other services. However, they are irrelevant to the actual invention and, therefore, they need not be discussed in more detail here.

The push recipient server, or any corresponding server component, may be configured as a computer or a microprocessor, such as single-chip computer element, including at least a memory providing storage area used for an arithmetic operation and an operation processor for executing the arithmetic operation. An example of the operation processor includes a central processing unit. The session initiation application in the receiving unit 31 and/or the converting unit 32 may be configured as a program executed by the operation processor, for example. Programs, also called program products, including software routines, applets and macros, can be stored in any server-readable data storage medium and they include program instructions to perform particular tasks, and they may be downloaded into a push recipient server. In other words, the servers or corresponding server components and/or other corresponding devices comprise means for implementing one or more functions of the push recipient server described here in an embodiment.

Examples of the reversed push flow will be illustrated below in FIGS. 4 and 5. In the examples it is assumed that the service is presence service requiring updates to user's presence information from a presence user agent in the user's user terminal, the user agent being configured to use PresUpdateMsg to provide updates of a presentity's presence information to a presence server providing the presence service. In other words, it is assumed that the application server is a presence server and the application in the user terminal is a presence user agent. A further assumption is that principles of a WAP push service, as defined by OMA, are used. Exemplary implementations of the principles are described below, but more detailed information can be found via OMA's internet pages www.openmobilealliance.org. Still another assumption is that the push messages are sent using the short message service as a bearer in such a manner that a first protocol stack used in transmission between the user terminal and SMSC is the one used when push messages are delivered to the user terminal, and a second protocol stack used in transmission between SMSC and the push recipient server is the one used in transmission between a push proxy gateway and SMSC when push messages are delivered from the push proxy gateway. The first protocol stack comprises the following protocols (from below upwards): SMS (short message service), WSP (wireless session protocol) and Push OTA/SIR (Push over-the-air/session initiation request). The second protocol stack comprises the following protocols (from below upwards): CIMD/SMPP (computer interface to message distribution/short message peer-to-peer protocol) and Push OTA/SIR. Thus, the push recipient server may be called an SMS application server.

Figure 4:
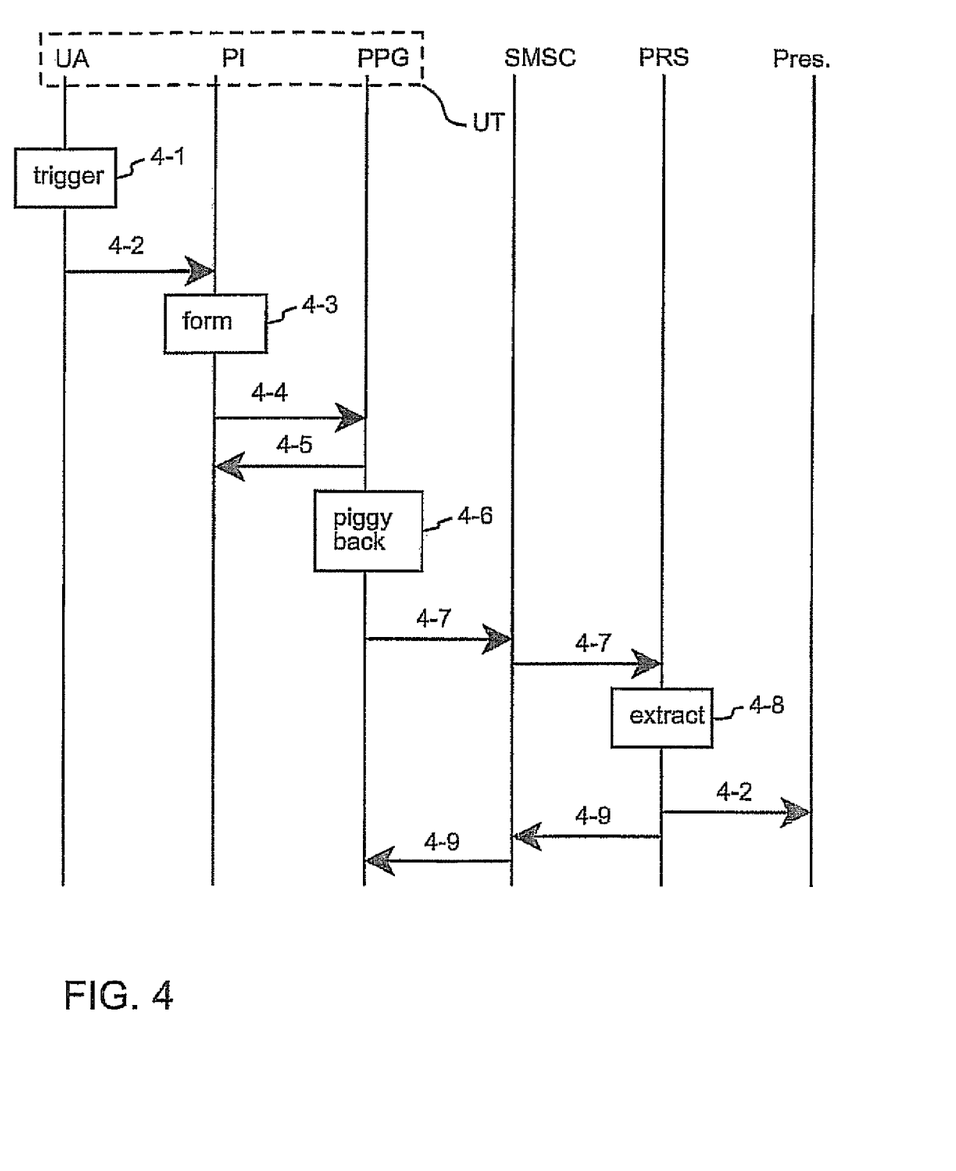
FIGS. 4 and 5 are diagrams illustrating data flows.

In the embodiment of FIG. 4, the unit handling the sending comprises the push initiator's submit function (PI), and the push server's amended push delivery function (PPG) and a push access protocol (PAP) is used between PI and PPG.

FIG. 4 starts when data transmitting is triggered, in point 4-1, in the presence user agent UA of the user terminal UT. Depending on the settings of UA, the data transmission may be triggered because some new information is received from a user (e.g. the user changes his/her presence status from active to busy), the terminal has changed its location, a timer has expired, the battery status changes, the network used changes from 3G to 2G, etc. However, it should be understood that the reason why the data transmission is triggered is of no significance to the invention and that the invention does not limit or require any reason triggering the sending of data, the triggering depends on the application and its settings.

In response to the triggering, UA forwards the data to which the triggering related via the proper API (not shown in FIG. 4) to PI in message 4-2 (PresUpdateMsg). PI forms, in point 4-3, a PAP message which is a push request. The PAP message comprises at least a control entity and a content entity. PI supplies the control entity with control information for PPG to use in processing the message for delivery, such as a "push message" describing the type of PAP message, name, address, or other identification of PI, and as a target address, the address of a push recipient server PRS serving the presence server PS. The content part is destined to the presence server and PI supplies the content entity with message 4-2 as received or compressed. Then the PAP message is ready, and PI sends it as message 4-4 to PPG.

In response to the message 4-4, PPG accepts the push request, and responds to it by sending message 4-5 (a push-response), message 4-5 indicating an initial acceptance of the PAP message. In the illustrated embodiment, PPG is configured to accept any message from PI since it is assumed that such a message will have the control entity in a proper format. After accepting message 4-4, PPG piggybacks, in point 4-6, the data in a push session initiation request and sends message 4-7 via SMSC to the push recipient server PRS, message 4-7 having as a client address the address of the push recipient server and as a server address the address of the user terminal. Message 4-7 is in the example SIR (POM-SESSION-REQUEST). Typically the data with its header information fits into one push session initiation request but PPG is preferably configured to segment the data, if required, into several requests in which case the data is sent in subsequent requests.

When the push recipient server, or, more precisely, the session initiation application's listening function in the push recipient server receives message 4-7, the push recipient server extracts, in point 4-8, the piggybacked content part, i.e. message 4-2, from the push session initiation request 4-7 and transmits message 4-2 to a proper application in an application server. The push recipient server also responds to the request by sending message 4-9 via SMSC to the user terminal, or more precisely, to the PPG in the user terminal. Message 4-9 may be a message rejecting the request, or accepting the request, it is of no significance to the embodiment.

Although not described above, PPG may also be configured to establish a push session, authenticate the receiver, and/or select a bearer, or push over a secure channel, for example.

In the above it is assumed that PPG is within the user terminal. However, in an embodiment the user terminal is a fixed user terminal connected via a fixed connection (PAP is not usable over air) to a push proxy gateway comprising the push server's push delivery function PPG described above. PPG in a push proxy gateway may be further configured to check whether to accept or reject the PAP message (reasons for rejecting include that the PAP message contains an entity not having a valid document type definition, additional reasons may be implementation-specific). In another embodiment a short message service centre provides access points to PI in which case PPG is not required.

As is apparent from the above, the embodiment provides data transmission from a user terminal without user interaction and with minimum delay, and there is no need to amend the functionality of an application to which data is submitted, or the functionality of the user agent, or the SMS bearer, or any other bearer. The delay caused by activating a packet data connection is avoided since sending a push session initiation request is almost instantaneous and does not require any session or connection setup. Besides, compared to the solution in which the packet data protocol context is kept alive, the load caused to the network by "dummy" signalling is avoided, and the user terminal's power consumption is smaller. The latter is an important advantage to a mobile terminal, especially to its battery, which is a precious resource.

Figure 5:
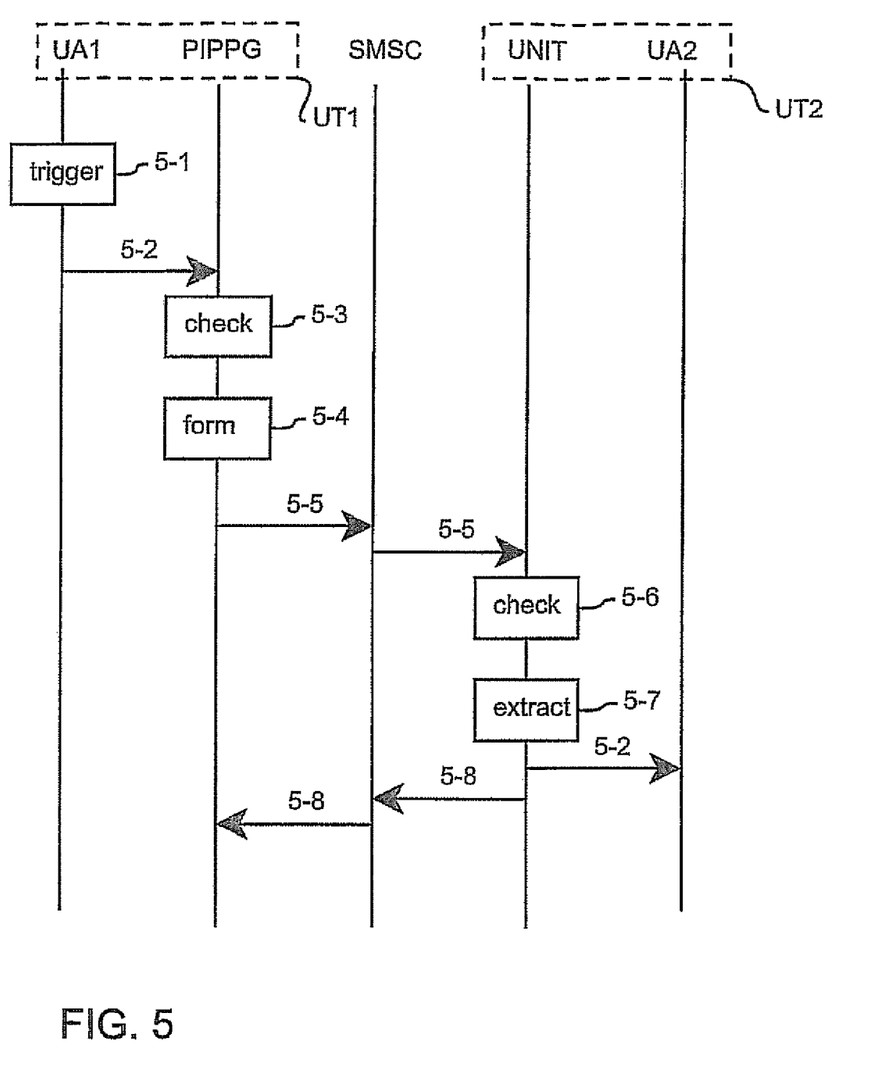

FIG. 5 is a flow chart illustrating a data flow according to another embodiment. In FIG. 5, instead of having a separate push initiator's submit function and a push server's amended delivery function, some elements of the push initiator's submit function and the push server's amended push delivery function are combined together to PIPPG to illustrate that the implementation of cooperation between a push initiator and a push server is of no significance to the invention.

FIG. 5 starts when data transmitting is triggered, in point 5-1, in the presence user agent UA1 of the user terminal UT1, as is described above in FIG. 4. In response to the triggering, UA1 forwards the data to which the triggering related via the proper API (not shown in FIG. 5) to PIPPG in message 5-2 (PresUpdateMsg).

PIPPG checks, in point 5-3, whether or not the data with its header information fits into one push session initiation request. In the illustrated example it is assumed that the data with its header information is short enough, and PPG piggybacks, in point 5-4, the data in a session initiation request and sends message 5-5 via SMSC to recipient user terminal UT2, message 5-5 having as a client address the address of user terminal UT2 and as a server address the address of the sending user terminal UT2. Message 5-5 is in the example SIR (POM-SESSION-REQUEST).

When the user terminal UT2, or, more precisely, a bidirectional unit or a receiving unit in the UT2, receives the session initiation request, it checks or detects, in point 5-6, whether the request contains piggybacked data. Since the request contains piggybacked data, the unit extracts, in point 5-7, the piggybacked content part, i.e. message 5-2, from the push session initiation request 5-5 and transmits message 5-2 to the proper user agent. The unit also responds to the request by sending message 5-8 via SMSC to the user terminal UT1, or more precisely, to the PIPPG in the user terminal UT1. Message 5-8 may be a message rejecting the request, or accepting the request, it is of no significance to the embodiment.

In an embodiment, PIPPG is configured to determine the length of the data before piggybacking it. If the data does not fit into one session initiation request, PIPPG according to the embodiment is preferably configured to establish a push session for delivering the data and to form a push message in which the data is sent. The push message comprises at least an addressing entity and a content entity. The addressing entity comprises the same address information as message 5-5 described above. PIPPG supplies the content entity with message 5-2 as received or compressed. Then the push message is ready. After that, or while the push message is formed, PIPPG instructs the recipient to establish a push session by sending a push session initiation request via SMSC to the recipient, the request having the above described addressing information but no piggybacked data. When the recipient receives the session initiation request, it responses by establishing connectivity with the network if not already done and by sending a connection request (POM-CONNECT-REQ). In response to the connection request, PIPPG sends a connection response (POM-CONNECT-RES). After the push message is ready and the connection response is sent, PIPPG pushes the data via SMSC to the recipient. The data may be pushed by using unconfirmed push and PO-UNIT-PUSH-message(s). Then PIPPG disconnects the push session. In other words, PIPPG according to the embodiment is configured to use also push sessions to deliver data.

In another embodiment of the invention, PIPPG may be configured to have another size limit to decide whether or not to piggyback the data. For example, PIPPG may be configured to send data piggybacked if no more than three subsequent session initiation requests are needed for delivering the data, for bigger amounts of data the push session is established.

Figure 6:
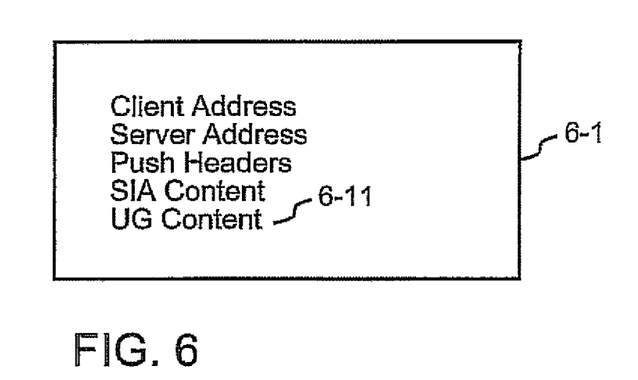
FIGS. 6 and 7 illustrate examples of message structures.
Figure 7:
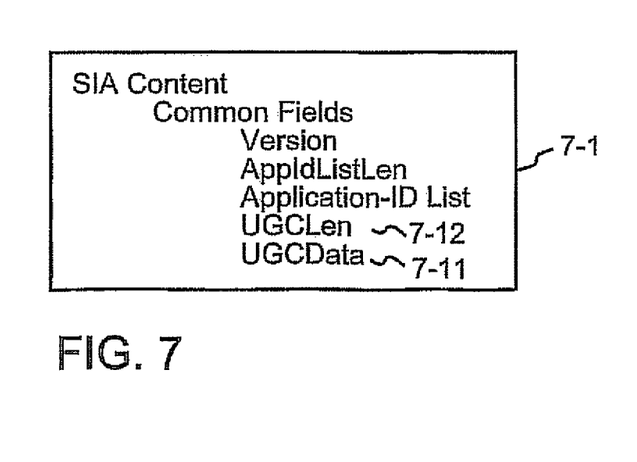

FIGS. 6 and 7 illustrate examples of how data can be piggybacked in a push session initiation request. It should be appreciated that other solutions also are possible. In the example of FIG. 6, a new field 6-11 is added to a push session initiation request 6-1 (POM Session Request) to be used for piggybacking the data in the request. The new field may be called "user generated content" (UG content) and it may contain data generated by a user agent, a user, or a user terminal, for example.

FIG. 7 illustrates another example. In the example of FIG. 7, two new subfields 7-11 and 7-12 are added to a subfield of the "SIA content" field called Common field, the SIA content field being a field in a push session initiation request 7-1 (POM Session Request). The new fields are a field 7-12 (UGCLen) indicating the length of the piggybacked data and then, after the "length" field, a field 7-11 (UGCData) for piggybacking the data 7-11. Thus, they are in the same order as the subfields required for application lists, and can be implemented in a similar way.

Although the invention has been described above by utilizing a push recipient server, it is obvious to one skilled in the art that the invention may be implemented without such a server by modifying the configurations of a short message service centre and/or the receiving application server.

Although the invention has been described above by using a short message service bearer, it is apparent for one skilled in the art that any bearer usable for transmitting push session initiation requests can be utilized.

Although the invention has been described above assuming that the push server's amended delivery function is located in a user terminal, or is intended to serve push initiators in user terminals, it should be appreciated that also push servers (push proxy gateways), receiving data to be pushed from one or more push initiators, may be configured to contain the amended delivery function, or one or more features of the amended push delivery function described above. The push server, or any corresponding server component, may be configured using the same principles and units (processor(s), program(s), memory, circuit(s) and/or chip(s)) as described above with user terminal, especially with FIG. 2, and the amended push delivery function may be configured as a program or an updated program executed by an operation processor in the push server, for example.

The points, messages and related functions described above in FIGS. 4 and 5 are in no absolute chronological order, and some of the points may be performed simultaneously or in an order differing from the given one. Other functions can also be executed between the points or within the points and other messages can be sent between the illustrated messages. Some of the points or part of the points can also be left out or replaced with a corresponding step/point or part of the point. The messages are only exemplary and may even comprise several separate messages for transmitting the same information. In addition, the messages may also contain other information.

It will be obvious to a person skilled in the art that, as technology advances, the inventive concept can be implemented in various ways. The invention and its embodiments are not limited to the examples described above but may vary within the scope of the claims.

We claim:

1. An apparatus comprising:
at least one processor; and
at least one memory including computer program code,
the at least one memory and the computer program code configured, with the at least one processor, to cause the apparatus at least to
piggyback data in a wireless push session initiation request; and
send the piggybacked wireless push session initiation request, wherein
the wireless push session initiation request contains a field reserved for piggybacked data and the piggybacking comprises adding the data to the field,
the wireless push session initiation request further contains a further field for indicating the length of the piggybacked data, and
the piggybacking further comprises determining the length and adding it to the further field.

2. An apparatus as claimed in claim 1, wherein the apparatus is further caused to trigger sending of data, and the piggybacking of data in a wireless push session initiation request is performed responsive to the triggering of sending of data, and the data is piggybacked in the wireless push session initiation request.

3. An apparatus as claimed in claim 1, wherein, in response to the data not fitting into one wireless push session initiation request, the data is sent in subsequent wireless push session initiation requests.

4. An apparatus as claimed in claim 1, wherein, in response to the data not fitting into a predetermined number of wireless push session initiation requests, a push session is established and the data is sent using the push session.

5. An apparatus as claimed in claim 1, wherein a push initiator's submit function is implemented.

6. An apparatus as claimed in claim 1, wherein the apparatus is further caused to:
listen to wireless push session initiation requests;
receive data piggybacked in a wireless push session initiation request; and
extract the piggybacked data from the push session initiation request and forward the data to a target application.

7. An apparatus comprising:
at least one processor; and
at least one memory including computer program code,
the at least one memory and the computer program code configured, with the at least one processor, to cause the apparatus at least to
listen to wireless push session initiation requests;
receive data piggybacked in a wireless push session initiation request, wherein
the wireless push session initiation request contains a field reserved for piggybacked data and the piggybacking comprises adding the data to the field,
the wireless push session initiation request further contains a further field for indicating the length of the piggybacked data, and
the piggybacking further comprises determining the length and adding it to the further field; and
extract the piggybacked data from the push session initiation request and forward the data to a target application.

8. An apparatus as claimed in claim 1, wherein the apparatus is a user terminal, a server, or a server component.

9. A method comprising:
receiving data to be sent to a recipient,
characterized by
piggybacking the data to a wireless push session initiation request, wherein
the wireless push session initiation request contains a field reserved for piggybacked data and the piggybacking comprises adding the data to the field,
the wireless push session initiation request further contains a further field for indicating the length of the piggybacked data, and
the piggybacking further comprises determining the length and adding it to the further field; and
sending the push session initiation request with the piggybacked data.

10. A method as claimed in claim 9, further comprising:
receiving a push session initiation request with piggybacked data;
extracting the data from the push session initiation request; and forwarding the data to a recipient.

11. A non-transitory computer readable medium having a computer program product stored thereon, the computer program product comprising computer program code, wherein the execution of the program code in an apparatus causes the apparatus to carry out the steps of the method according to claim 9.

12. A communication system configured to support wireless push, characterized in that the communication system comprises:
a first apparatus for piggybacking data in a wireless push session initiation request and sending the piggybacked wireless push session initiation request, wherein
the wireless push session initiation request contains a field reserved for piggybacked data and the piggybacking comprises adding the data to the field,
the wireless push session initiation request further contains a further field for indicating the length of the piggybacked data, and
the piggybacking further comprises determining the length and adding it to the further field; and
a second apparatus for listening to wireless push session initiation requests and for receiving data piggybacked in a wireless push session initiation request.

13. A communication system as claimed in claim 12, wherein the communication system further comprises a short message service center; and the first and second apparatuses are configured to use a short message service bearer for the wireless push session initiation requests.

14. A communication system as claimed in claim 13, wherein the communication system further comprises a circuit switched network; and the first apparatus is configured to be connectable to the short message service center via the circuit switched network.

15. A communication system as claimed in claim 12, wherein the first apparatus further comprises a push initiator's submit function.

16. A communication system as claimed in claim 12, wherein the first apparatus is a user terminal.

17. A communication system as claimed in claim 12, wherein the system further comprises a third apparatus, the third apparatus comprising a push initiators submit function.

18. A communication system as claimed in claim 17, wherein the third apparatus is a user terminal or a push initiator, and the first apparatus is a push server.

19. A communication system as claimed in claim 12, wherein the second apparatus is a user terminal.

20. A communication system as claimed in claim 12, wherein the second apparatus is a push recipient server configured to extract the data piggybacked in a wireless push session initiation request and to forward the data to an application in an application server.

* * * * *